United States Patent
Kim et al.

(10) Patent No.: US 8,731,462 B2
(45) Date of Patent: May 20, 2014

(54) APPARATUS FOR MEASURING RADIO RELAY CHANNEL AND METHOD THEREOF

(75) Inventors: Myung-Don Kim, Daejeon-si (KR);
Heon-Kook Kwon, Daejeon-si (KR);
Jae-Joon Park, Daejeon-si (KR);
Byung-Jae Kwak, Seoul (KR);
Hyun-Kyu Chung, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 833 days.

(21) Appl. No.: 12/962,211

(22) Filed: Dec. 7, 2010

(65) Prior Publication Data

US 2011/0151772 A1 Jun. 23, 2011

(30) Foreign Application Priority Data

Dec. 17, 2009 (KR) .................. 10-2009-0126223
May 20, 2010 (KR) .................. 10-2010-0047606

(51) Int. Cl.
*H04B 1/60* (2006.01)

(52) U.S. Cl.
USPC ........................................ 455/9; 455/67.11

(58) Field of Classification Search
CPC .... H04B 7/15; H04B 7/15542; H04B 7/1555; H04B 7/15592
USPC .............. 455/7–11.1, 14–25, 67.11; 370/315
See application file for complete search history.

(56) References Cited

U.S. PATENT DOCUMENTS

| 8,446,861 | B2 | 5/2013 | Kim et al. |
| 2006/0221927 | A1* | 10/2006 | Yamada et al. ............ 370/345 |
| 2009/0040960 | A1 | 2/2009 | Kim et al. |

FOREIGN PATENT DOCUMENTS

| EP | 1 850 509 A1 | 10/2007 |
| JP | 2007-295569 A | 11/2007 |
| KR | 10-2005-0117127 A | 12/2005 |
| KR | 10-2006-0059884 | 6/2006 |
| KR | 10-2009-0059790 | 6/2009 |
| WO | 2004/107693 | 12/2004 |

* cited by examiner

*Primary Examiner* — Raymond Dean
(74) *Attorney, Agent, or Firm* — Kile Park Reed & Houtteman PLLC

(57) ABSTRACT

An apparatus and method for measuring radio relay channel are provided capable of easily measuring a radio relay channel on each radio link among a base station (BS), a relay station (RS) and a mobile station (MS) and providing a reliable result of measuring the characteristics of radio relay channel by controlling transmission/reception timing based on variation in operation time among the BS, the RS and the MS.

15 Claims, 8 Drawing Sheets

APPARATUS FOR MEASURING RADIO RELAY CHANNEL AND METHOD THEREOF

CROSS-REFERENCE TO RELATED APPLICATION

This application claims the benefit under 35 U.S.C. §119(a) of Korean Patent Application No. 10-2009-0126223, filed on Dec. 17, 2009, and No. 10-2010-0047606, filed on May 20, 2010, the disclosure of which is incorporated by reference in its entirety for all purposes.

BACKGROUND

1. Field

The following description relates to a technique of measuring characteristics of a radio relay channel, and more particularly, to an operation of an apparatus for measuring characteristics of a radio relay channel and a processing measurement timing signal of the apparatus.

2. Description of the Related Art

Recent developments in technology for maximizing the transmission capacity in mobile communication have tended toward combining the transmit diversity and multiuser diversity or cooperative communications.

In particular, a cooperative mobile communication technique using a relay station (RS) is a candidate technique for a next generation mobile communication system and is regarded as capable of substantially improving the transmission capacity in wireless transmission by use of an RS between a base station (BS) and a mobile station (MS) and virtual multiple input multiple output (MIMO) technology.

In the Cooperative Mobile Communication using an RS, the RS serves to eliminate a shadow region and extend a cell coverage and also optimize the transmission quality of data to be transmitted to the MS in cooperation with the BS.

Such a wireless transmission technology is achieved by applying a MIMO system using multiple antennas, and delivers a performance depending on spatial characteristics of a time variant MIMO channel. That is, since the system using multiples antenna is more susceptible to the characteristics of a radio relay channel than a conventional single antenna system would, it is very important to precisely recognize characteristics of the radio relay channel when designing the multiple antenna system.

In general, the next generation wireless communication system using multiple antennas is used in urban areas having buildings and trees, which give significant influence wave propagation. In addition, the wireless communication system is used for wireless high speed data transmission indoors.

In particular, in developing a next generation mobile communication system such as the IMT-Advanced system, propagation characteristics of a spatial channel including multiple antennas within a wireless interface need to be analyzed and mathematically modeled. The characteristics of the radio relay channel vary depending on frequency band, geographical features, climate, etc. Accordingly, in order to perform reliable modeling for the radio relay channel, the radio relay channel needs to be measured in various environments and accurate measurement data for the radio relay channel needs to be obtained and analyzed.

SUMMARY

In one aspect, there is provided an apparatus for measuring a radio relay channel and a method thereof, capable of easily measuring a radio relay channel on each radio link among a base station (BS), a relay station (RS) and a mobile station (MS) and providing a reliable result of measuring the characteristics of radio relay channel by controlling transmission/reception timing based on variation in operation time among the BS, the RS and the MS.

In one general aspect, there is provided an apparatus for measuring radio relay channel. The radio relay channel measuring apparatus includes a control unit and a Radio Frequency (RF) transmission/reception unit. The control unit is configured to set an operation mode to one of a base station (BS) mode, a relay station (RS) mode and a mobile station (MS) mode according to a user input and to control transmission/reception of a radio relay channel measuring signal according to the operation mode set by the control unit. The RF transmission/reception unit is configured to transmit and receive the radio relay channel measuring signal in a wireless scheme according to a transmission/reception timing that is determined based on the operation mode set by the control unit.

In another general aspect, there is provided a method of measuring radio relay channel. The radio relay channel measuring method is as follows. At three radio relay channel measuring apparatuses that are spaced apart from each other, an operation mode is set to one of a base station (BS) mode, a relay station (RS) mode and a mobile station (MS) mode according to a user input. At each of three radio relay channel measuring apparatuses, the radio relay channel measuring signal is transmitted/received in a wireless scheme according to a transmission/reception timing that is determined depending on the operation mode. At the radio relay channel measuring apparatuses, characteristics of a radio relay channel is recognized by analyzing the radio relay channel measuring signal collected from the RS mode radio relay channel measuring apparatus and the MS mode radio channel measuring apparatus.

Accordingly, the radio relay channel for each radio link among the BS, the RS and the MS is measured at the same time by installing the radio relay channel measuring apparatus, which can be set to one of a BS mode, an RS mode and an MS mode, on the BS, the RS and the MS, by setting a predetermined operation mode of the BS mode, the RS mode and the MS mode and performing transmission/reception timing control based on the determined operation mode and the variation in operation time among the BS, the RS and the MS.

In addition, the measurement of radio relay channel is not performed at each position of the BS, the RS and the MS while circulating the BS, the RS and the MS, but respective radio relay channels among the BS, the RS and the MS are simultaneously measured in a state that the radio relay channel measuring apparatus according to the present invention is installed at each of the BS, the RS and the MS. Accordingly, the time and cost required for measuring a radio relay channel are reduced.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, detailed examples will be described with reference to the accompanying drawings.

Figure 1:
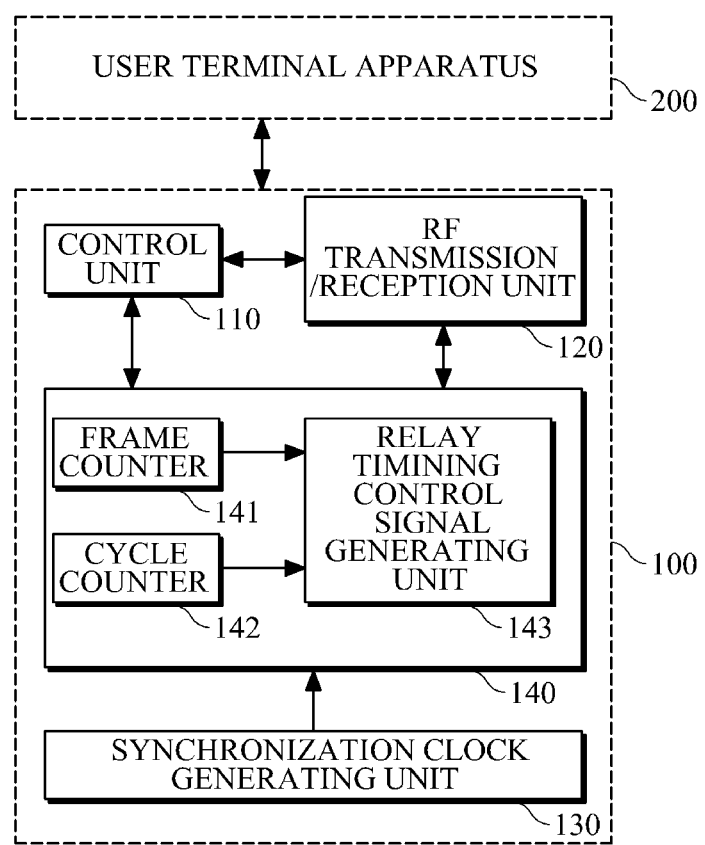
FIG. 1 is a block diagram showing an example of an apparatus for measuring a radio relay channel.

FIG. 1 is a block diagram showing an example of an apparatus for measuring radio relay channel. As shown in FIG. 1, an apparatus 100 for measuring a radio relay channel includes a control unit 110 and an RF transmission/reception unit 120.

The control unit 110 sets an operation mode of the apparatus to one of a base station (BS) mode, a relay station (RS) mode and a mobile station (MS) mode according to a user input and controls overall operations of the radio relay channel measuring apparatus 100 including transmission/reception of a radio relay channel measuring signal.

The radio relay channel measuring apparatus 100 is installed on each of a BS, an RS and an MS, and operates in one of the BS mode, the RS mode and the MS mode.

The user input, which is used to set the operation mode of the radio relay channel measuring apparatus 100 to one of the BS mode, the RS mode and the MS mode, is implemented by a user terminal apparatus 200, such as a laptop computer connectable to the radio relay channel measuring apparatus 100.

As an example, the user terminal apparatus 200 is connected to the radio relay channel measuring apparatus 100 to run software for setting an operation mode of the radio relay channel measuring apparatus 100. Then, a user selects one of the BS mode, the RS mode and the MS mode through a user interface for setting an operation mode, and the radio relay channel measuring apparatus 100 stores information about the selected operation mode, thereby completing the setting of the operation mode.

After the radio relay channel measuring apparatus 100 is set to one of the BS mode, the RS mode and the MS mode according to the user input, the control unit 110 performs transmission/reception control of a radio relay channel measuring signal according to the operation mode. The control operation of the radio relay channel measuring signal will be described later in detail.

According to an example, the control unit 110 may set the number of transmitting antennas and receiving antennas according to the user input such that the radio relay channel measuring apparatus 100 is applied to a multiple input multiple output (MIMO) system using multiple antennas.

The RF transmission/reception unit 120 transmits and receives the radio relay channel measuring signal in a wireless scheme according to a transmission/reception timing that is determined depending on the operation mode set by the control unit 110. The determining of transmission/reception timing will be described later in detail.

Figure 2:
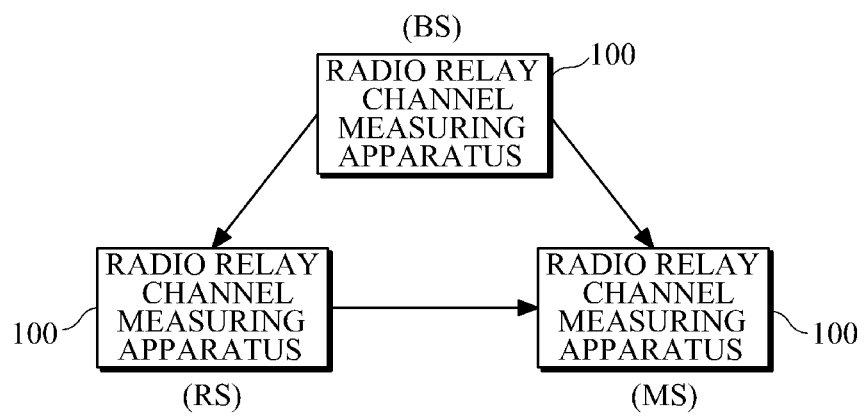
FIG. 2 is a schematic diagram showing a measurement of a radio relay channel using the radio relay channel measuring apparatus shown in FIG. 1.

FIG. 2 is a schematic diagram showing a measurement of a radio relay channel. As shown in FIG. 2, in measuring a radio relay channel, three radio relay channel measuring apparatuses 100 are installed on each position of a BS, an RS and an MS, respectively. Then, each radio relay channel measuring apparatus 100 sets its own operation mode to one of a BS mode, an RS mode and an MS mode to correspond to each position. Then, each radio relay channel measuring apparatus 100 transmits and receives a radio relay channel measuring signal according to a transmission/reception timing that is determined based on its own operation mode.

Radio relay channel measuring signals are collected from each radio relay channel measuring apparatus 100, and the collected radio relay channel measuring signals are analyzed in software for analyzing characteristics of the radio relay channel installed on the user terminal apparatus 200 such as a laptop computer connectable to each radio relay channel measuring apparatus, so that a radio relay channel on each radio link among the BS, the RS and the MS is measured.

In this manner, the radio relay channel measuring apparatus 100 according to the present invention simultaneously measures the radio relay channel for each radio link among the BS, the RS and the MS in a simple manner by installing the radio relay channel measuring apparatus, which can be set to one of a BS mode, an RS mode and an MS mode, on the BS, the RS and the MS, setting an operation mode and performing transmit/receive timing control based on the operation mode and the variation in time among the BS, the RS and the MS.

In addition, according to the present invention, it is not that the measurement of the radio relay channel is performed at each position of the BS, the RS and the MS while circulating the BS, the RS and the MS, but the radio relay channel measuring apparatus according to the present invention is installed at each of the BS, the RS and the MS and simultaneously measures respective radio relay channels among the BS, the RS and the MS. Accordingly, the time and cost required for measuring the radio relay channel is reduced According to another example, the radio relay channel measuring apparatus 100 may further include a synchronization clock generating unit 130 and a relay timing control unit 140 to control transmit/receive timing based on the variation in time among the BS, the RS and the MS.

The synchronization clock generating unit 130 generates a transmission/reception synchronization signal (TRX_Sync) for synchronizing transmission/reception time with respect to another radio relay channel measuring apparatus and a local clock and a sampling clock for operating the radio relay channel measuring apparatus 100, by using a system synchronization signal (System SYNC).

The relay timing control unit 140 generates a transmission/reception timing control signal suitable for the operation mode, based on radio relay channel measurement-timing parameters according to the operation mode and based on the transmission/reception synchronization signal (TRX_Sync) generated by the synchronization clock generating unit 130.

The radio relay channel measurement-timing parameters may be set by a user through the user terminal apparatus 200, and include the bandwidth for measurement, the length of PN chips, the number of transmitting antennas, the number of receiving antennas, the iteration count of an Rx code, the number of frames, the number of cycles, the cycle off time, and the acquisition off time.

The transmission/reception timing control signal may include a synchronization start signal (SYNC_START), a synchronization stop signal (SYNC_STOP), a relay timing clock (Relay Timing Clock), an acquisition trigger signal, and a Tx/Rx antenna switch control signal.

The relay timing control unit 140 may include a frame counter 141, a cycle counter 142 and a relay timing control signal generating unit 143. The frame counter 141 is configured to count the number of frames by analyzing the radio relay channel measurement-timing parameters. The cycle counter 142 is configured to count the number and time of cycles by analyzing the radio relay channel measurement-timing parameters.

The timing control signal generating unit 143 is configured to generate the transmission/reception timing control signal by use of the number of frames counted by the frame counter 141 and the number and time of cycles counted by the cycle counter 142. The transmission/reception timing control signal generated by the timing control signal generating unit 143 is transmitted to the control unit 110 and the RF transmission/reception unit 120. The radio relay channel measuring apparatus 100 transmits and receives the radio relay channel measuring signal in a wireless scheme according to the transmission/reception timing that is determined based on the operation mode.

In this case, the radio relay channel measuring apparatus 100 may be configured to emit a radio relay channel measuring signal to a wireless network and receive a radio relay channel measuring signal from the wireless network through multiple antennas.

Figure 3:
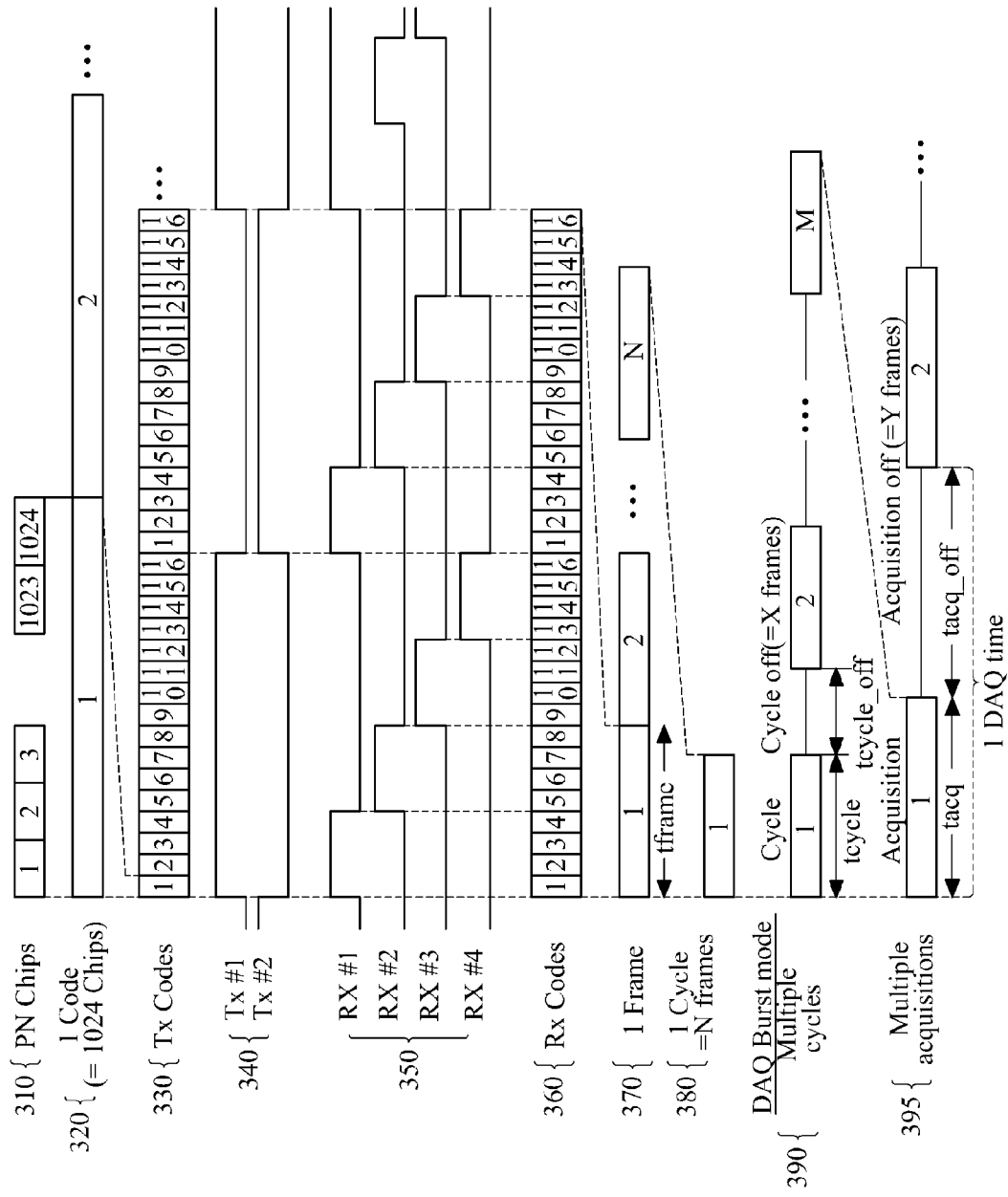
FIG. 3 is a timing diagram showing a radio relay channel measuring signal that is transmitted/received by the radio relay channel measuring apparatus shown in FIG. 1.

FIG. 3 is a timing diagram showing a radio relay channel measuring signal that is transmitted/received by the radio relay channel measuring apparatus shown in FIG. 1. As shown in FIG. 3, 'PN chips' represent a radio relay channel measuring signal 310 used in a radio relay channel measuring apparatus and, it is assumed that the length of PN chips serving as a radio relay channel measurement-timing parameter is 1024 in FIG. 3.

In this case, a basic unit 320 of the radio relay channel measuring signal used in the measurement of radio relay channel is a code, and one code has a length corresponding to 1024 chips. 'Tx Codes' 330 transmitted to measure the radio relay channel are implemented in a serial repetition of the basic unit 320.

It may be assumed that the bandwidth for measurement is 100 MHz, the number of transmitting antennas is 2, the number of receiving antennas is 4, the iteration count of the Rx codes is 4, the number of frames is N, the number of cycles is M, the cycle off time is X frames, and the acquisition off time is Y frames.

As shown in FIG. 3, the switching timing of each antenna in a multiple antenna system having 2 transmitting antennas and 4 receiving antennas is implemented by a Tx Antenna Switch Control Signal 340 and an Rx Antenna Switch Control Signal 350.

Referring to FIG. 3, the switching of the receiving antenna (Rx Antenna) is sequentially performed from Rx Antenna #1 and Rx Antenna #4. The total time taken to complete the switching of all receiving antennas once is the same as the time taken to complete the switching of a transmitting antenna Tx Antenna #1.

After that, for Tx Antenna #2, all of the receiving antennas are sequentially switched similarly to when the Tx Antenna #1 is switched. In this case, the switching time of the receiving antenna (Rx Antenna) is determined by the iteration count of an Rx code 360 of the radio relay channel measurement-timing parameter. If the iteration count of the Rx code 360 is 4, the switching time of the receiving antenna is four times the period of a code.

That is, the bandwidth for measurement is 100 MHz, the Rx Antenna Switching time and the Tx Antenna Switching Time are expressed as follows.

(Period of a code)=(Length of $PN$ chips)×(1/Bandwidth)=1024×10 ns=10.24 μs ($Rx$ Antenna Switching Time)=(Period of a code)× (Iteration Count of $Rx$ codes)=10.24 μs×4=40.96 μs ($Tx$ Antenna Switching Time)=(Number of receiving antennas)×($Rx$ Antenna Switching Time)=4× 40.96 μs=163.84 μs As shown in FIG. 3, the Rx codes 360 represent the amount of data to be received when all of the transmitting antennas and the receiving antennas are switched once. The Rx codes constitute one frame 370, and the time of one frame (tframe) is expressed as follows.

$t$frame=(Number of transmitting antennas)×($Tx$ Antenna Switching Time)=(Number of transmitting antennas)×(Number of receiving antennas)× ($Rx$ Antenna Switching Time)=(Number of transmitting antennas)×(Number of receiving antennas)×(Period of a code)×(Iteration Count of an $Rx$ code)=2×4×10.24 μs×4=327.8 μs If the number of frames of radio relay channel measurement-timing parameters is N, the N frames constitute a Cycle 380, and if N=10, the time of one cycle (tcycle) is expressed as follows.

$t$cycle=(Number of frames)×$t$frame=10×327.68 μs=3.2768 ms

As shown in FIG. 3, multiple cycles 390 and multiple acquisitions 395 are implemented when a data acquisition (DAQ) mode for receiving data in the radio relay channel measuring apparatus 100 is a burst mode.

The burst mode represents that the number of cycles is larger than 1. That is, when measuring radio relay channel, the data acquisition is performed at each cycle, and the data acquired at each cycle is collected and stored.

In the burst mode, the multiple cycles 390 having the number of cycles of M, the cycle is repeated M times and data reception is not performed during cycle off time.

If cycle off time of radio relay channel measurement-timing parameters is X frames, and X=2, the cycle off time 'tcylc_off' is expressed as follows.

$t$cycle_off=$X$ frames×$t$frame=2×327.8 μs=655.36 μs.

Accordingly, if the number of cycles is M (M=4) in the multiple cycles 390, and the cycle off time is X frames (X=2), an acquisition time 'tacq' is expressed as follows.

$t$acq=($t$cycle×The number of cycles)+($t$cycle_off× (The number of cycles−1))=(3.2769 ms×4)+ (0.65536 ms×3)=15.073728 ms As shown in FIG. 3, the multiple acquisitions 395 represent that the repetition of acquisition and acquisition off, in which the control unit 110 of the radio relay channel measuring apparatus 100 temporarily stores the received data during the acquisition time and transmits the temporarily stored data to the user terminal apparatus 200 during acquisition off time.

In this case, the acquisition off time is given as a radio relay channel measurement-timing parameter and is an integer multiple of the frame. If the number of frames is Y (Y=10), the acquisition off time 'tacq_off' is expressed as follows.

$$tacq\_off = tframe \times Y\ frames = 327.68\ \mu s \times 10 = 3.2768\ \mu s$$

Figure 4:
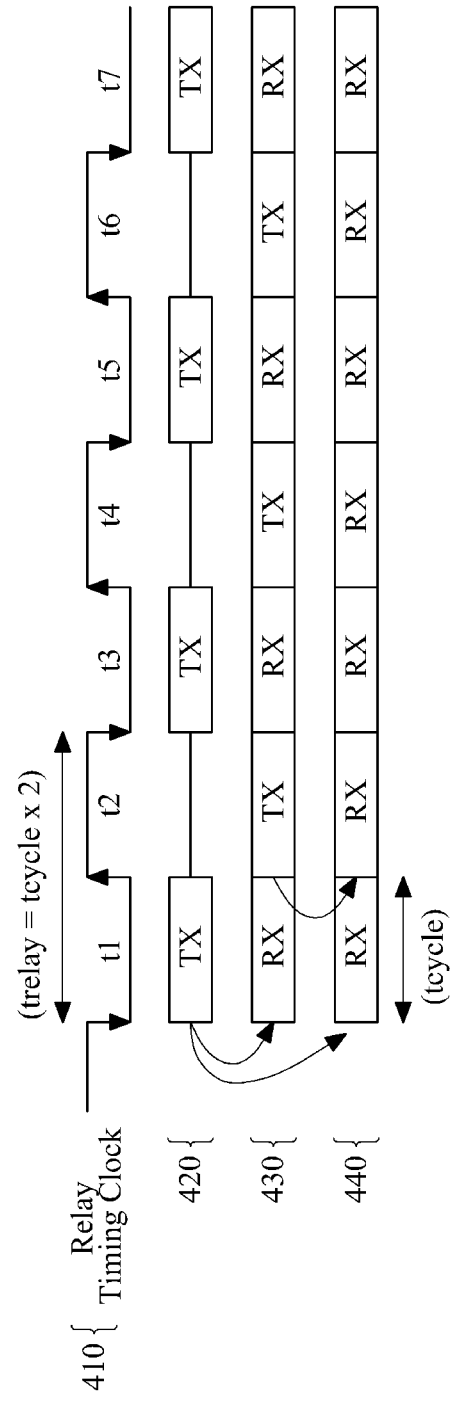
FIG. 4 is a timing diagram showing an operation of the radio relay channel measuring apparatus shown in FIG. 1.

FIG. 4 is a timing diagram showing an operation of the radio relay channel measuring apparatus shown in FIG. 1. FIG. 4 shows a radio relay channel measuring signal transmission/reception timing generated using a radio relay channel measurement-timing parameter when radio relay channel measuring apparatuses are set to the BS mode, the RS mode and the MS mode, respectively.

A relay timing clock 410 is a transmission/reception timing control signal generated in the relay timing control unit 140 of the radio relay channel measuring apparatus 100. In FIG. 4, respective radio relay channel measuring apparatuses are configured to generate the same relay timing clock which occurs at a period 'trelay' which is twice a cycle time 'tcycle.'

In FIG. 4, a radio relay channel measuring signal transmitted by the radio relay channel measuring apparatus 420, which is set to the BS mode, during a time 't1,' is received to the radio relay channel measuring apparatus 430 set to the RS mode and the radio relay channel measuring apparatus 440 set to the MS mode and stored.

That is, during the time 't1,' the radio relay channel measuring apparatus 420 set to the BS mode only performs transmission, and the respective radio relay channel measuring apparatuses 430 and 440 set to the RS mode and the MS mode only perform reception.

After that, during a time 't2,' a radio relay channel measuring signal transmitted by the radio relay channel measuring apparatus 430 set to the RS mode is received to the radio relay channel measuring apparatus 440 set to the MS mode and stored.

That is, during the time 't2,' the radio relay channel measuring apparatus 420 set to the BS mode stops operation, the radio relay channel measuring apparatus 430 set to the RS mode performs only transmission and the radio relay channel measuring apparatus 440 set to the MS mode performs only reception.

After that, operations during a time 't3' are identical to those performed during the time 't1.' Operations during a time 't4' are identical to those performed during the time 't2.' That is, during an assigned relay time 'trelay,' radio relay channel measuring signals are collected from all radio links among the respective radio relay channel measuring apparatuses 420, 430 and 440.

According to another example, the control unit 110 may set a data acquisition mode to a snapshot mode for measuring a radio relay channel in a wireless environment having an invariant radio relay channel or a burst mode for measuring a radio relay channel in a wireless environment having a continuously variant radio relay channel, according to a user input.

If the data acquisition mode is set to a snapshot mode, the relay timing control unit 140 generates a transmission/reception timing control signal, which instructs a BS mode radio relay channel measuring apparatus, an RS mode radio relay channel measuring apparatus and an MS mode radio relay channel measuring apparatus to transmit and receive the radio relay channel measuring signal according to the same relay timing clock.

Figure 5:
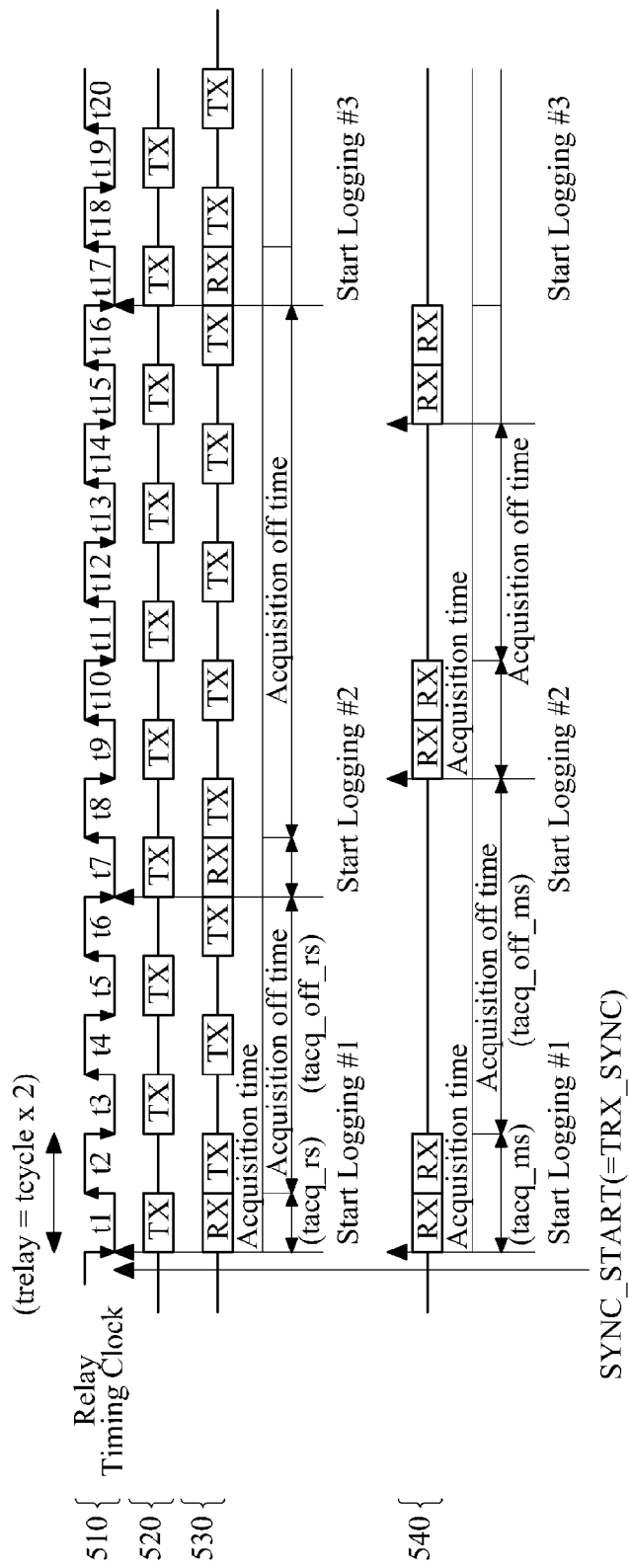
FIG. 5 is a timing diagram showing an operation of the radio relay channel measuring apparatus in a snapshot mode.

FIG. 5 is a timing diagram showing an operation of the radio relay channel measuring apparatus in a snapshot mode. FIG. 5 shows the timing of the radio relay channel measuring apparatus of FIG. 4, which is set to a snapshot mode for measuring a radio relay channel in a wireless environment having invariant radio relay channel.

The relay timing clock 510 is a transmission/reception timing control signal generated in the relay timing control unit 140 of the radio relay channel measuring apparatus. Respective radio relay channel measuring apparatuses generate the same relay timing clocks, which are synchronized with each other among the respective radio relay channel measuring apparatuses.

The relay timing clock 510 is a timing reference signal which serves as a standard for transmitting and receiving a radio relay channel measuring signal in the radio relay channel measuring apparatuses 520, 530 and 540 respectively set to a BS mode, an RS mode and an MS mode.

The synchronization of the relay timing clock 510 is achieved by a transmission/reception synchronization signal (TRX_Sync) that is generated from a synchronization clock generating unit 130 of the radio relay channel measuring apparatus and transmitted to the relay timing control unit 140.

That is, each of the BS mode-radio relay channel measuring apparatus 520, the RS mode-radio relay channel measuring apparatus 530 and the MS mode-radio relay channel measuring apparatus 540 perform transmission/reception according to the relay timing clock 510 which is synchronized by the transmission/reception synchronization signal (TRX_Sync).

In addition, a user of each of the BS mode-radio relay channel measuring apparatus 520, the RS mode-radio relay channel measuring apparatus 530 and the MS mode-relay channel measuring apparatus 540 synchronizes a synchronization start signal (SYNC_START) with the transmission/reception synchronization signal (TRX_Sync).

Each of the BS mode-radio relay channel measuring apparatus 520, the RS mode-radio relay channel measuring apparatus 530 and the MS mode-relay channel measuring apparatus 540 operates according to its own relay timing clock 510 according to the synchronization start signal (SYNC_START).

The radio relay channel measuring apparatus 520 set to the BS mode performs transmission (Tx) in low intervals (t1, t3, t5, . . . ) of the relay timing clock 510.

Meanwhile, the radio relay channel measuring apparatus 530 set to an RS mode performs reception (Rx) in low intervals (t1, t3, t5, . . . ) of the relay timing clock 510 and transmission (Tx) in high intervals (t2, t4, t6, . . . ) of the relay timing clock 510.

The radio relay channel measuring apparatus 540 set to an MS mode performs reception (Rx) in low intervals (t1, t3, t5, . . . ) and high intervals (t2, t4, t6, . . . ) of the relay timing clock 510.

That is, a radio relay channel measuring signal transmitted by the BS mode radio relay channel measuring apparatus 520 during the time t1 is received to the RS mode radio relay channel measuring apparatus 530 and the MS mode radio relay channel measuring apparatus 540 and stored.

Meanwhile, a radio relay channel measuring signal transmitted by the RS mode radio relay channel measuring apparatus 530 during the time t2 is received to the MS mode radio relay channel measuring apparatus 540 and stored.

As shown in FIG. 5, the point of time at which first transmission of data or first reception of data occurs, that is, Start Logging #1 matches among the radio relay channel measuring apparatuses 520, 530 and 540.

In this case, the radio relay channel measuring apparatus 530 set to an RS mode receives and temporarily stores a radio relay channel measuring signal, which is transmitted from the radio relay channel measuring apparatus 520 set to a BS mode, during acquisition time 'tacq_rs' after Start Logging #1, and sends the user terminal apparatus 200 the radio relay channel measuring signal during acquisition off time 'tacq_off_rs.' After the start logging #2, the above operations are repeated.

Meanwhile, the radio relay channel measuring apparatus 540 set to an MS mode sequentially receives radio relay channel measuring signals, which are each transmitted from the radio relay channel measuring apparatus 520 set to a BS mode and the radio relay channel measuring apparatus 530 set to an RS mode (RS), and temporarily stores the received radio relay channel during acquisition time 'tacq_ms' after start logging #1. Then, the radio relay channel measuring apparatus 540 sends the user terminal apparatus 200 the radio relay channel measuring signals during acquisition off time 'tacq_off_ms.' After the start logging #2, the above operations are repeated.

As shown in FIG. 5, the size of each received radio relay channel measuring signal and the time taken to store the each radio relay channel measuring signal are different between the RS mode radio relay channel measuring apparatus 530 and the MS mode relay channel measuring apparatus 540, so the acquisition off time 'tacq_off_rs' of the RS mode radio relay channel measuring apparatus 530 cannot be equal to the Acquisition Off time 'tacq_off_ms' of the MS mode radio relay channel measuring apparatus 540.

In this regard, a radio relay channel measuring apparatus using a snapshot mode as shown in FIG. 5 is suitable for a wireless environment having an invariant radio relay channel.

Meanwhile, in a burst mode, the relay timing control unit 130 is configured to generate a transmission/reception timing control signal, which instructs to change the number of cycles according to the intention for measurement in consideration of a travelling speed and an environment of the MS mode radio relay channel measuring apparatus to transmit and receive the radio relay channel measuring signal.

Figure 6:
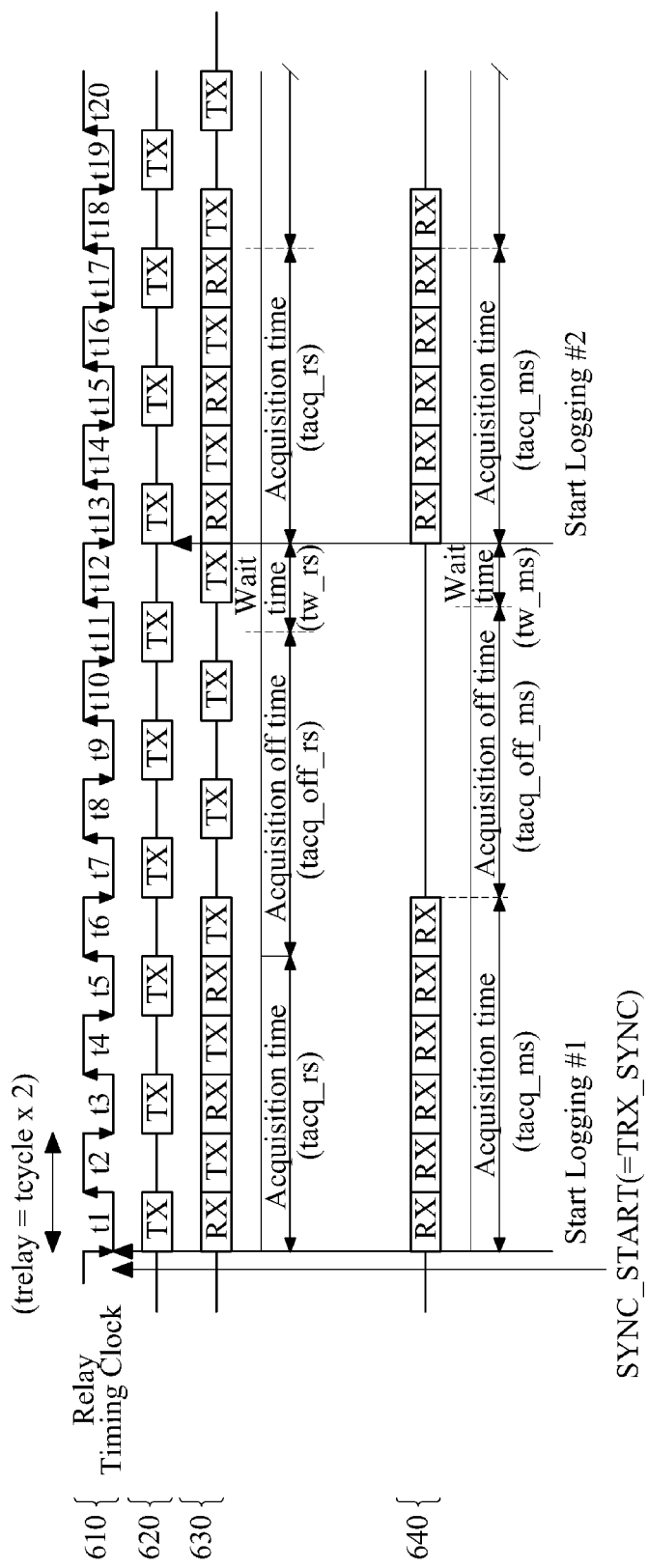
FIG. 6 is a timing diagram showing an operation of the radio relay channel measuring apparatus in a burst mode.

FIG. 6 is a timing diagram showing an operation of the radio relay channel measuring apparatus in a burst mode. FIG. 6 shows the timing of the radio relay channel measuring apparatus of FIG. 4, which is set to a burst mode for measuring radio relay channel in a wireless environment having a continuously variant radio relay channel.

In a wireless environment having a continuously variant radio relay channel among a BS mode radio relay channel measuring apparatus 620, an RS mode radio relay channel measuring apparatus 630 and an MS mode radio relay channel measuring apparatus 640, a radio relay channel characteristic measured between the BS mode radio relay channel measuring apparatus 620, and the RS mode radio relay channel measuring apparatus 630, a radio relay channel characteristic measured between the RS mode radio relay channel measuring apparatus 630, and the MS mode radio relay channel measuring apparatus 640, and a radio relay channel characteristic measured between the MS mode radio relay channel measuring apparatus 640 and the BS mode radio relay channel measuring apparatus 620 need to maintain coherent channel characteristics. In this regard, the radio relay channel measuring apparatus in a burst mode needs to have a timing diagram shown in FIG. 6.

In the burst mode, the measurement time point of radio relay channel of the BS mode radio relay channel measuring apparatus 620, the RS mode radio relay channel measuring apparatus 630 and the MS mode radio relay channel measuring apparatus 640 is performed while changing the number of cycles according to an intention for measurement in consideration of a travelling speed and an environment of the MS mode radio relay channel measuring apparatus 640 and matching the measurement time point, thereby continuously storing measured data.

As shown in FIG. 6, the radio relay channel measurement-timing parameters are set such that the number of cycles is 3, cycle off time (tcycle_off) is 0, and the period (trelay) of a relay timing clock is twice a cycle time (tcycle).

The operation of the respective radio relay channel measuring apparatuses after start logging #1 are identical to those shown in FIG. 5, and the transmission/reception start point of the respective radio relay channel measuring apparatuses should be resynchronized at start logging #2.

Accordingly, considering that acquisition off time 'tacq_off_rs' of the RS mode radio relay channel measuring apparatus 630 is different from acquisition off time 'tacq_off_ms' of the MS mode radio relay channel measuring apparatus 640, wait time 'tw_rs' of the RS mode radio relay channel measuring apparatus 630 and wait time 'tw_ms' of the MS mode radio relay channel measuring apparatus 640 are calculated and used to resynchronize start logging #2, so that the RS mode radio relay channel measuring apparatus 630 and the MS mode radio relay channel measuring apparatus 640 receives radio relay channel measuring signals at the same time.

As described above, the timing for receiving channel measurement data, that is, a relay timing clock, is controlled by use of radio relay channel measurement timing parameters, and the period 'trelay' of the relay timing clock may have a flexible width varying from a minimum condition of trelay 1.920 μs with no upper bound.

Minimum Condition: (Length of PN chips)=32, (Bandwidth for Measurement)=100 MHz, (Number of transmitting antennas)=1, (Number of receiving antennas)=1, and (Iteration Count of an Rx code)=3.

$$trelay(=2 \times tcycle)=(\text{Length of }PN\text{ chips}) \times (1/\text{Bandwidth for measurement}) \times (\text{Number of transmitting antennas}) \times (\text{Number of receiving antennas}) \times (\text{Iteration Count of an }Rx\text{ code}) \times 2 = 1.920\ \mu s$$

If the period of a relay timing clock is set to be the same as a time transfer interval (TTI) for a conventional wireless communication system using a relay, the present invention may perform measurement based on the conventional wireless communication system using a relay. In addition, the present invention may cope with a change in a transmission period of relay data in a next generation relay based wireless communication system and perform measurement of radio relay channel adaptably with such a variant environment.

Figure 7:
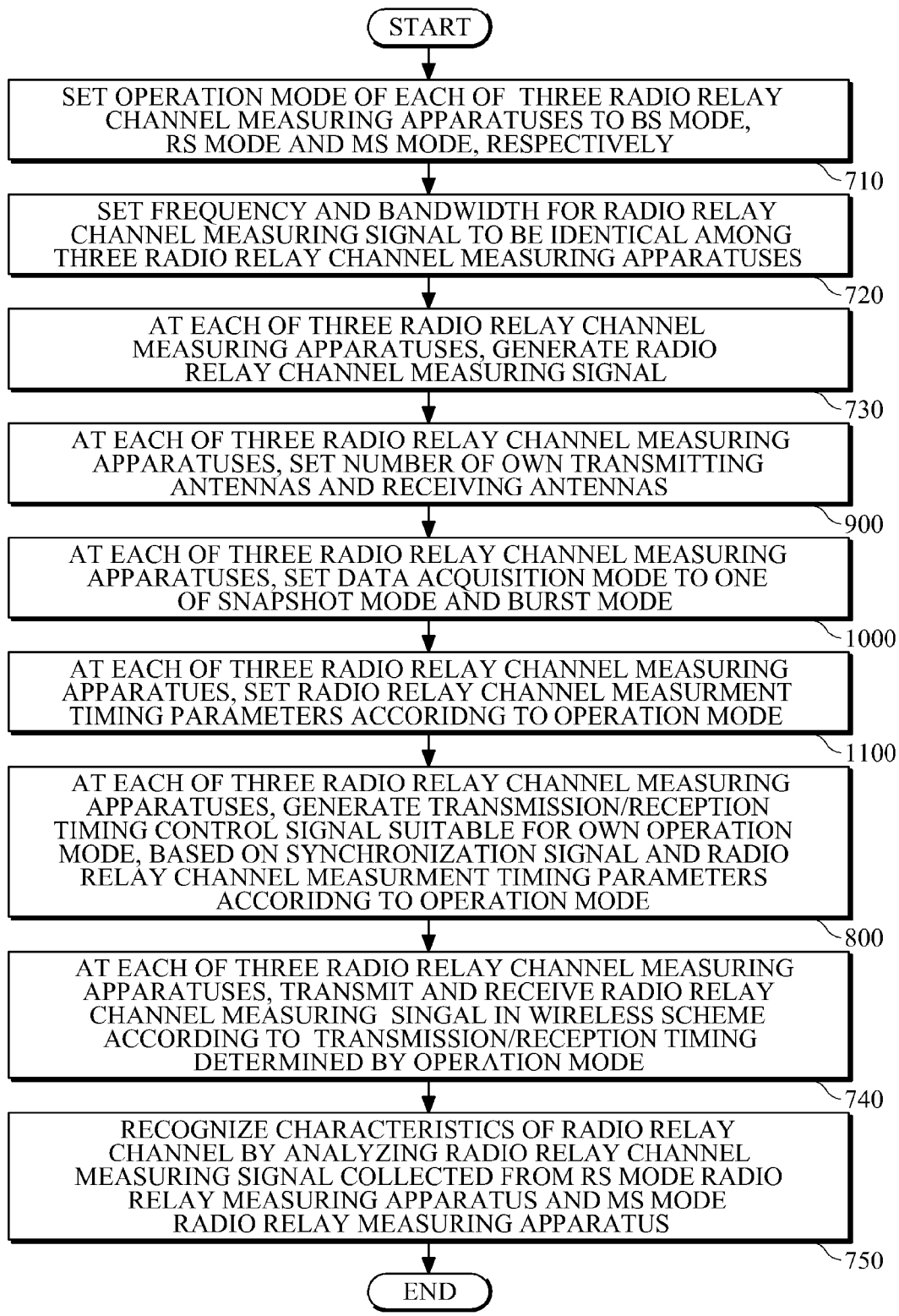
FIG. 7 is a flowchart showing an example of a method for measuring a radio relay channel.

Hereinafter, a method of measuring radio relay channel characteristics by use of the radio relay channel measuring apparatus according to the present invention will be described with reference to FIG. 7. FIG. 7 is a flowchart showing an example of a method for measuring a radio relay channel. The method of measuring radio relay channel includes setting an operation mode of each of three radio relay channel measuring apparatuses (710), initializing the radio relay channel measuring apparatuses (720), generating a radio relay channel measuring signal (730), transmitting and receiving the radio relay channel measuring signal (740) and analyzing channel characteristics (750).

In the setting of an operation mode (710), each of three radio relay channel measuring apparatuses that are spaced apart from each other set an operation mode to one of a BS mode, an RS mode and an MS mode according to a user input.

In the initializing of the radio relay channel measuring apparatuses (720), the three radio relay channel measuring apparatuses set to the BS mode, the RS mode and the MS mode, respectively, set the frequency and bandwidth for transmitting and receiving a radio relay channel measuring signal to be identical among the three radio relay channel measuring apparatuses.

In the generating of a measurement signal (730), the radio relay channel measuring apparatuses set to the BS mode and the RS mode, respectively, generate a radio relay channel measuring signal.

In the transmitting and receiving signals (740), each of three radio relay channel measuring apparatuses transmit and receive the radio relay channel measuring signal in a wireless scheme according to a transmission/reception timing that is determined based on the operation mode.

In the analyzing of channel characteristics (750), the radio relay channel measuring signals collected from the RS mode radio relay channel measuring apparatus and the MS mode radio channel measuring apparatus are analyzed through a user terminal apparatus, thereby recognizing characteristics of the radio relay channel.

As described above, according to the present invention, the radio relay channel for each radio link among the BS, the RS and the MS is simultaneously measured by installing the radio relay channel measuring apparatus, which can be set to one of a BS mode, an RS mode and an MS mode, on the BS, the RS and the MS, and by setting an operation and performing transmit/receive timing control based on the operation mode and the variation in time among the BS, the RS and the MS.

Also, the measurement of radio relay channel is not performed at each position of the BS, the RS and the MS while circulating the BS, the RS and the MS, but the respective radio relay channels among the BS, the RS and the MS are simultaneously measured in a state that the radio relay channel measuring apparatus according to the present invention is installed at each of the BS, the RS and the MS. Accordingly, the time and cost required for measuring the radio relay channel is reduced.

Meanwhile, according to another example, the radio relay channel measuring method may further include generating a timing control signal (800). In the generating of a timing control signal (800), the respective radio relay channel measuring apparatuses generate a transmission/reception timing control signal suitable for the operation mode based on radio relay channel measurement-timing parameters according to its own operation mode and based on a synchronization signal.

The radio relay channel measurement-timing parameters include bandwidth for measurement, length of PN chips, number of transmitting antennas, number of receiving antennas, iteration count of an Rx code, number of frames, number of cycles, cycle off time, and acquisition off time.

The transmission/reception timing control signal includes a synchronization start signal, a synchronization stop signal, a relay timing clock, an acquisition trigger signal, and a Tx/Rx antenna switch control signal.

Figure 8:
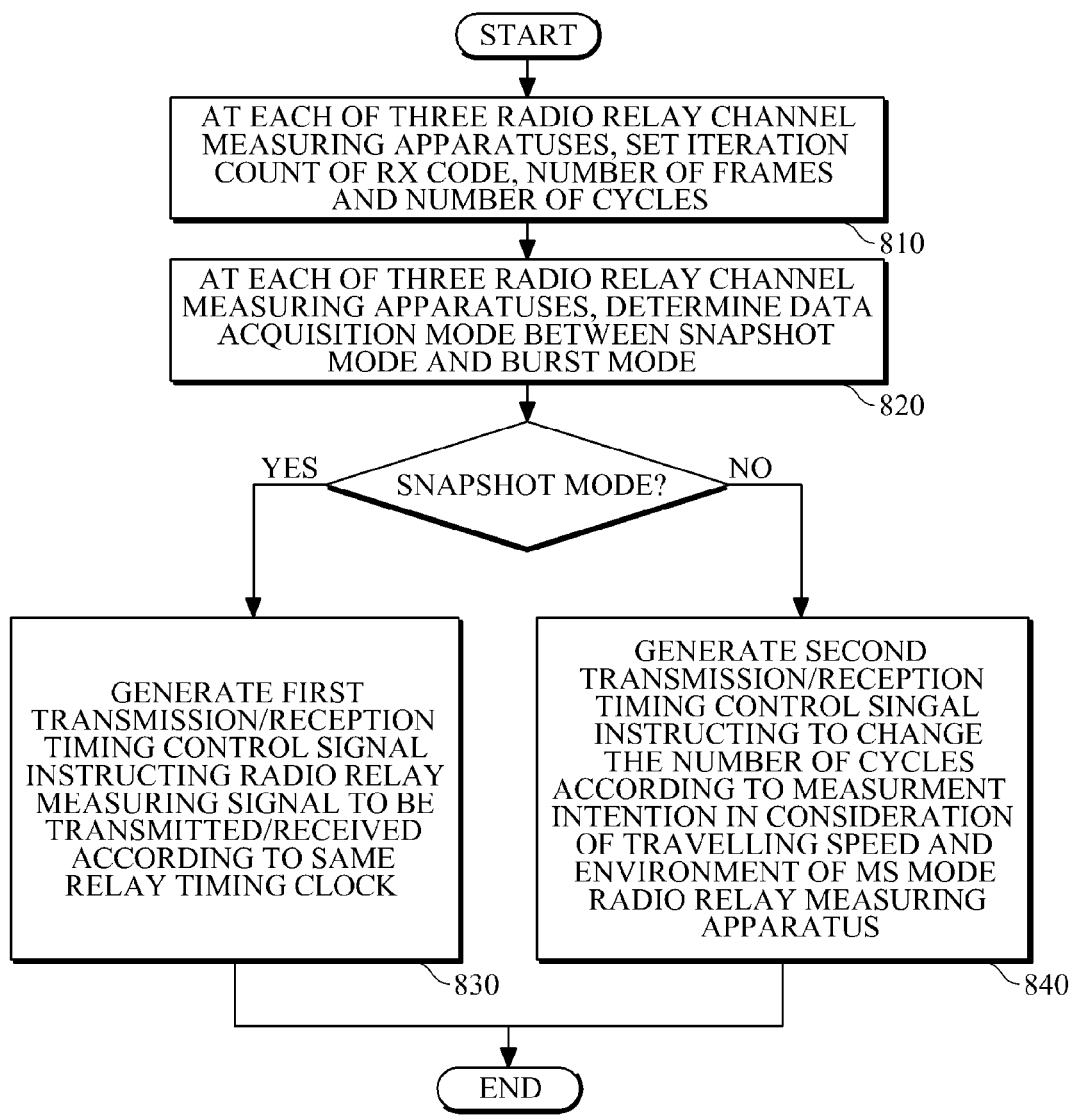
FIG. 8 is a flowchart showing a process of generating a transmission/reception timing control signal.

The generating of a timing control signal (800) is implemented as shown in FIG. 8. FIG. 8 is a flowchart showing a process of generating a transmission/reception timing control signal. The generating of a timing control signal (800) includes setting (810) and determining (820).

In the setting (810), the respective radio relay channel measuring apparatuses set the iteration count of an Rx code, the number of frames, the number of cycles, the cycle off time and the acquisition off time.

In the determining (820), it is determined whether each of the radio relay channel measuring apparatuses is set to a snapshot mode or a burst mode.

If the radio relay channel measuring apparatus is set to a snapshot mode, a first transmission/reception timing control signal is generated (830) in which the first transmission/reception timing control signal instructs the three relay channel measuring apparatuses to transmit and receive the radio relay channel measuring signal according to the same relay timing clock.

If the radio relay channel measuring apparatus is set to a burst mode, a second transmission/reception timing control signal is generated (840) in which the second transmission/reception timing control signal instructs to the number of cycles according to an intention for measurement in consideration of a travelling speed and an environment of the MS mode radio relay channel measuring apparatus to transmit and receive the radio relay channel measuring signal.

Since the generating of a transmission/reception timing control signal based on radio relay channel measurement-timing parameters and the transmission/reception synchronization signal has been described above, detailed description thereof will be omitted in order to avoid redundancy.

According to another example, the method of measuring a radio relay channel may further include processing a user input including setting the number of transmitting antennas and receiving antennas (900), setting a data acquisition mode or setting radio relay channel measurement timing parameters.

In the setting of the number of antennas of the radio relay channel measuring method, each of the radio relay channel measuring apparatuses may be configured to set the number of antennas according to a user input. According to this example, the present invention is applied to a system using multiple antennas such as a MIMO system by setting the number of transmitting antennas and receiving antennas.

As an example, the method of measuring a radio relay channel may further include setting a data acquisition mode (1000) in which each of the radio relay channel measuring apparatuses sets a data acquisition mode to a snapshot mode for measuring a radio relay channel in a wireless environment having an invariant radio relay channel or a burst mode for measuring a radio relay channel in a wireless environment having a continuously variant radio relay channel, according to a user input. According to this example, reliable measurement for radio relay channel characteristics is obtained by varying the data acquisition mode depending on an environment for radio relay channel. Since the controlling of transmission/reception timing based on the data acquisition mode has been described above, detailed description thereof will be omitted in order to avoid redundancy.

As an example, the method of measuring a radio relay channel may further include setting parameters (1100) in which each of the radio relay channel measuring apparatuses is configured to set radio relay channel measurement-timing parameters according to its own operation mode.

In the setting of parameters (1100), the radio relay channel measurement-timing parameters are set by a user. The radio relay channel measurement-timing parameters include bandwidth for measurement, length of PN chips, the number of transmitting antennas, the number of receiving antennas, the iteration count of an Rx code, the number of frames, the number of cycles, the cycle off time, and the acquisition off time.

Accordingly, the radio relay channel for each radio link among the BS, the RS and the MS is simultaneously measured by installing the radio relay channel measuring apparatus, which can be set to one of a BS mode, an RS mode and an MS mode, on the BS, the RS and the MS, by setting an operation and performing transmit/receive timing control based on the operation mode and the variation in time among the BS, the RS and the MS.

Also, the measurement of radio relay channel is not performed at each position of the BS, the RS and the MS while circulating the BS, the RS and the MS, but respective radio relay channel among the BS, the RS and the MS are simultaneously measured in a state that the radio relay channel measuring apparatus according to the present invention is installed at each of the BS, the RS and the MS. Accordingly, the time and cost required for measuring radio relay channel is reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for measuring radio relay channel, the apparatus comprising:
   a control unit configured to set an operation mode to one of a base station (BS) mode, a relay station (RS) mode and a mobile station (MS) mode according to a user input and to control transmission/reception of a radio relay channel measuring signal according to the operation mode set by the control unit; and
   a Radio Frequency (RF) transmission/reception unit configured to transmit and receive the radio relay channel measuring signal in a wireless scheme according to a transmission/reception timing that is determined based on the operation mode set by the control unit.

2. The apparatus of claim 1, further comprising:
   a synchronization clock generating unit configured to generate a transmission/reception synchronization signal used to synchronize transmission/reception time with respect to another radio relay channel measuring apparatus, and a local clock and a sampling clock used to operate the radio relay channel measuring apparatus; and
   a relay timing control unit configured to generate a transmission/reception timing control signal suitable for the operation mode, based on radio relay channel measurement-timing parameters according to the operation mode and the transmission/reception synchronization signal generated by the synchronization clock generating unit.

3. The apparatus of claim 2, wherein the relay timing control unit comprises:
   a frame counter configured to count number of frames by analyzing the radio relay channel measurement-timing parameters;
   a cycle counter configured to count number and time of cycles by analyzing the radio relay channel measurement-timing parameters; and
   a relay timing control signal generating unit configured to generate the transmission/reception timing control signal by use of the number of frames counted by the frame counter and the number and time of cycles counted by the cycle counter.

4. The apparatus of claim 2, wherein the control unit sets a data acquisition mode to a snapshot mode for measuring a radio relay channel in a wireless environment having an invariant radio relay channel or a burst mode for measuring a radio relay channel in a wireless environment having a continuously variant radio relay channel, according to a user input.

5. The apparatus of claim 4, wherein the relay timing control unit generates the transmission/reception timing control signal, which instructs a BS mode radio relay channel measuring apparatus, an RS mode radio relay channel measuring apparatus and an MS mode relay channel measuring apparatus to transmit and receive the radio relay channel measuring signal according to same relay timing clock, if the data acquisition mode is set to the snapshot mode.

6. The apparatus of claim 4, wherein the relay timing control unit generates the transmission/reception timing control signal, which instructs to change the number of cycles according to an intention for measurement in consideration of a travelling speed and an environment of the MS mode radio relay channel measuring apparatus to transmit and receive the radio relay channel measuring signal, if the data acquisition mode is set in the burst mode.

7. The apparatus of claim 2, wherein the radio relay channel measurement-timing parameters include a bandwidth for measurement, a length of PN chips, number of transmitting antennas, number of receiving antennas, iteration count of an Rx code, number of frames, number of cycles, cycle off time, and acquisition off time.

8. The apparatus of claim 3, wherein the transmission/reception timing control signal includes a synchronization start signal, a synchronization stop signal, a relay timing clock, an acquisition trigger signal, and a Tx/Rx antenna switch control signal.

9. A method of measuring radio relay channel, the method comprising:
   at each of three radio relay channel measuring apparatuses that are spaced apart from each other, setting an operation mode to one of a base station (BS) mode, a relay station (RS) mode and a mobile station (MS) mode according to a user input;
   at each of three radio relay channel measuring apparatuses set to the BS mode, the RS mode and the MS mode, respectively setting a frequency and a bandwidth for transmitting and receiving a radio relay channel measuring signal to be identical among the three radio relay channel measuring apparatuses;
   at each of the radio relay channel measuring apparatuses set to the BS mode and the RS mode, respectively generating a radio relay channel measuring signal;
   at each of three radio relay channel measuring apparatuses, transmitting and receiving the radio relay channel measuring signal in a wireless scheme according to a transmission/reception timing that is determined depending on the operation mode; and
   at the radio relay channel measuring apparatuses, recognizing characteristics of a radio relay channel by analyzing the radio relay channel measuring signal collected from the RS mode radio relay channel measuring apparatus and the MS mode radio channel measuring apparatus.

10. The method of claim 9, further comprising:
    at each of three radio relay channel measuring apparatuses, generating a transmission/reception timing control signal suitable for the operation mode, based on radio relay channel measurement-timing parameters and a synchronization signal according to its own operation mode.

11. The method of claim 10, further comprising:
at each of three radio relay channel measuring apparatuses, setting radio relay channel measurement-timing parameters according to its own operation mode.

12. The method of claim 10, further comprising:
at each of three radio relay channel measuring apparatuses, setting a data acquisition mode to a snapshot mode for measuring a radio relay channel in a wireless environment having an invariant radio relay channel or a burst mode for measuring radio relay channel in a wireless environment having a continuously variant radio relay channel, according to a user input.

13. The method of claim 12, wherein the generating of the transmission/reception timing control signal comprises:
setting an iteration count of an Rx code, number of frames and number of cycles;
determining a data acquisition mode between a snapshot mode and a burst mode;
generating a first transmission/reception timing control signal, which instructs each of three relay channel measuring apparatuses to transmit and receive the radio relay channel measuring signal according to same relay timing clock, if the data acquisition mode is set to the snapshot mode; and
generating a second transmission/reception timing signal, which instructs to change the number of cycles according to an intention for measurement in consideration of a travelling speed and an environment of the MS mode radio relay channel measuring apparatus to transmit and receive the radio relay channel measuring signal, if the data acquisition mode is set in the burst mode.

14. The method of claim 10, wherein the radio relay channel measurement-timing parameters include a bandwidth for measurement, length of PN chips, number of transmitting antennas, number of receiving antennas, iteration count of an Rx code, number of frames, number of cycles, cycle off time, and acquisition off time.

15. The method of claim 10, wherein the transmission/reception timing control signal includes a synchronization start signal, a synchronization stop signal, a relay timing clock, an acquisition trigger signal, and a Tx/Rx antenna switch control signal.

* * * * *